United States Patent [19]

Fenstermaker et al.

[11] Patent Number: 4,597,807

[45] Date of Patent: Jul. 1, 1986

[54] ACCELERATED CARBURIZING METHOD WITH DISCRETE ATMOSPHERES

[75] Inventors: Michael L. Fenstermaker, Danielsville; Mark A. Pellman, Allentown, both of Pa.

[73] Assignee: Air Products and Chemicals, Inc., Allentown, Pa.

[21] Appl. No.: 670,706

[22] Filed: Nov. 13, 1984

[51] Int. Cl.⁴ .............................................. C21D 1/74
[52] U.S. Cl. .................................. 148/16.5; 148/16.7
[58] Field of Search ..................... 146/16, 16.5, 16.6, 146/16.7, 19, 20.3; 432/31, 147, 175, 198, 113

[56] References Cited

U.S. PATENT DOCUMENTS

| | | | |
|---|---|---|---|
| 2,594,876 | 4/1952 | Cope | 266/108 |
| 3,259,527 | 7/1966 | Beggs | 748/16.5 |
| 3,397,875 | 8/1968 | Davis | 148/16.5 |
| 3,950,192 | 4/1976 | Golland | 148/16.5 |
| 4,145,232 | 3/1979 | Solomon | 148/16.5 |
| 4,306,918 | 12/1981 | Kaspersma et al. | 148/16.5 |
| 4,317,687 | 3/1982 | Kaspersma et al. | 148/16.5 |
| 4,322,255 | 3/1982 | Kostelitz | 148/16.5 |

OTHER PUBLICATIONS

Kaspersma and Shay, "A Model for Carbon Transfer in Gas-Phase Carburization of Steel—Journal of Heat Treating, vol. 1, No. 4, p. 27.
Peartree, "Two-Step Accelerated Carburizing Shortens Cycle, Saves Energy—Heat Treating Jul. 1981, p. 36.

*Primary Examiner*—Christopher W. Brody
*Attorney, Agent, or Firm*—Geoffrey L. Chase; E. Eugene Innis; J. C. Simmons

[57] ABSTRACT

A method for operating a continuous rotary carburizing furnace is disclosed, wherein a carburizing mixture is introduced into the furnace retort without inerts while an inert gas is introduced into the shell of the furnace without carbon containing gases. The method effects an increase in productivity through an increased rate of carburization of work pieces with less carburization or sooting of the furnace apparatus.

10 Claims, 2 Drawing Figures

ACCELERATED CARBURIZING METHOD WITH DISCRETE ATMOSPHERES

TECHNICAL FIELD

The present invention is directed to a method for the carburization of ferrous articles in a carburizing furnace. More particularly, the present invention is a method for increasing the rate of carburization of ferrous articles while decreasing carburization or sooting of the furnace structure, specifically the furnace heat source and refractory materials. The present invention has particular application to continuous rotary carburizing furnaces.

BACKGROUND OF THE PRIOR ART

Carburization is a conventional method for case hardening of various ferrous articles, such as steel components. In the typical gas phase carburization technique, a gas atmosphere is utilized which has the capability of transferring carbon to the surface of the steel article being treated, such that the carbon is adsorbed onto the surface of the article and then diffused at appropriate temperatures into the surface zones of the article. Various carbon donating atmospheres have been used in the past including endothermic atmosphere produced from the combustion in a heated catalytic retort under partial oxidation conditions of a hydrocarbon with air to produce a mixture of carbon monoxide, hydrogen and nitrogen. Typically, endothermic atmospheres are produced external to the carburizing furnace and blended with additional hydrocarbon enriching gas prior to entering the furnace.

It is also known to synthetically produce such an endothermic atmosphere within the carburizing furnace by blending methanol, nitrogen and a hydrocarbon and subjecting the mixture to high temperatures. It is theorized that the carbon monoxide acts as a shuttle for carbon from a high temperature heat source in the furnace to the surface of the ferrous article being treated. The source of the shuttled carbon is the enriching hydrocarbon gas. Such hydrocarbon is cracked under conditions of high temperature in the carburization furnace on the heat source or radiant tubes which are at a higher temperature than the articles. Water, present as a by-product in the carburization reactions, is believed to combine with the carbon cracked on the high temperature heating surfaces of the carburization furnace to form carbon monoxide and hydrogen. As the carbon monoxide contacts the ferrous articles to be carburized, the carbon monoxide reacts with hydrogen to deposit carbon on the article and result in water as a by-product. Therefore, the presence of carbon monoxide acts to shuttle the carbon of the cracking enriching gas from a high temperature surface in a carburizing furnace to the lower temperature surface of the articles being carburized, wherein the carbon monoxide disassociates to form carbon and oxygen, the latter of which reforms with available hydrogen to form water. It can be seen that in order to accelerate the carburizing effect, carbon monoxide must be readily available to shuttle carbon from the high temperature surface to the carburizing article. It is equally important to provide a carbon source consisting of the enriching gas in order to replenish the carbon utilized from carbon monoxide during the carburization and to allow the water of the carburizing reaction to reach the site of the cracking hydrocarbon so as to form carbon monoxide with such carbon.

This theory of carbon shuttling is set forth in an article by Kaspersma and Shay entitled "A Model For Carbon Transfer In Gas-Phase Carburization of Steel" presented in the Journal of Heat Treating, Vol. 1, No. 4, at page 27.

It is also known to utilize a methanol and enriching gas atmosphere without nitrogen in at least one stage of the carburization process as set forth in an article by Peartree entitled "Two-Step Accelerated Carburizing Shortens Cycle, Saves Energy" presented in Heat Treating, July 1981, page 36. The use of dissociated methanol and enriching gas undiluted with nitrogen in a continuous belt furnace is also discussed. The ratio of enriching gas to methanol was similar to that employed in a conventional carburizing furnace. Accelerated carburizing rates were observed with both techniques. The two-stage process set forth in the article wherein a pure methanol-methane atmosphere is initially used in one stage, while a synthetic endothermic atmosphere is used in a second stage of a carburization process is also the subject of U.S. Pat. No. 4,306,918.

In U.S. Pat. No. 4,317,687, a process for carburizing ferrous metal articles is set forth wherein nitrogen, ethanol and water are injected into the furnace with or without a hydrocarbon enriching agent, such as propane, to produce the carburizing atmosphere.

Patents of additional interest to the carburization art include U.S. Pat. No. 4,145,232 which is directed to a carburizing atmosphere in a furnace wherein the hydrocarbon is maintained in a precise concentration $Z_A$ below the level of 10% so as to minimize the amount of carburizing gas necessary, and U.S. Pat. No. 4,322,255 which is directed to a carburizing atmosphere wherein the atmosphere is measured in the carburizing furnace and the hydrocarbon content is controlled in the range of 0.2 to 30%.

When endothermic, synthetic endothermic and other carburizing atmospheres are introduced into a one zone or open furnace, the rate of carbon monoxide formation is relatively high because of the high temperature of the radiant heat tubes or other heat sources of the carburizing furnace, which high temperature surfaces are readily accessible and favor carbon monoxide formation from the enriching hydrocarbon. However in a continuous rotary retort furnace or any furnace having discrete zones for carburizing and for the heat sources where each is isolated from the other, the carburizing atmosphere that comes in contact with the articles to be carburized does not enjoy the advantage of the high temperature heat source surfaces and therefore the rate of carbon monoxide formation is reduced and carburization of the articles is retarded. Practitioners in the prior art have attempted to remedy this result by further enriching the carburizing mixture to the entire furnace to enhance the formation of carbon monoxide at the lower temperatures of the furnace retort by increasing the proportion of hydrocarbons to crack at the lower rate of conversion. This attempt to maintain or enhance carburization creates the sooting problem in the heat source zone because the enriched carburizing mixture also contact the radiant heat tubes of the furnace and deposits undesired carbon thereon at the higher rate that the higher concentration of enriching gas dictates.

The present invention overcomes this problem of sooting and the ensuing furnace inefficiency and downtime by the method set forth below which reduces sooting and enhances carburization by using two techniques which individually would aggreviate these problems.

BRIEF SUMMARY OF THE INVENTION

The present invention is a method for carburizing ferrous metal articles in a furnace in which the heat source is in a zone physically isolated from the carburizing zone where the articles are processed, wherein the improvement comprises introducing a carburizing mixture of an oxygenated hydrocarbon and a hydrocarbon enriching gas into the carburizing zone substantially without any inert gas while introducing an inert gas into the zone of the furnace heat source substantially without any carburizing mixture.

The oxygenated hydrocarbon is preferably selected from the group comprising alcohols, aldehydes, esters, ethers and mixtures thereof having up to three carbon atoms, no more than one carbon to carbon bond, a carbon to oxygen ratio of 1 to 2 and a boiling point no greater than 100° C.

Preferably the hydrocarbon enriching gas is chosen from the group comprising methane, ethane and propane. The inert gas is preferably nitrogen.

Optimally the carburizing mixture is methanol and methane with up to 10% by volume of an inert gas.

The method of the present invention has particular applicability to a continuous rotary carburizing furnace wherein a cylindrical retort is situated inside the furnace shell and wherein the radiant heat source for the furnace is inside the shell, yet outside the cylindrical retort.

DETAILED DESCRIPTION OF THE INVENTION

Figure 2:
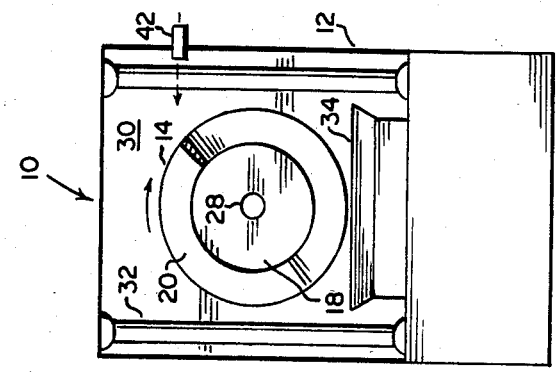
FIG. 2 constitutes a cross-sectional view of the rotary furnace of FIG. 1 taken along lines 2—2.

Heat treating of ferrous articles, such as carbon steel components. is typically the bottleneck activity in a production plant for such articles. If the productivity in the heat treat process increases, the overall efficiency of the entire plant can be enhanced. In order to accelerate the treatment of ferrous articles in the heat treating or carburizing furnace portion of the production plant, the carbon deposition is increased to the highest practical level by injecting the optimum amount of carbon source material, such as enriching gas specifically methane or similar hydrocarbons, in a carbon monoxide and hydrogen containing working atmosphere. Because of the physical design of a continuous rotary retort furnace used for carburizing ferrous articles, an inherent problem of soot formation in the shell of the furnace and, in particular, on the radiant heat sources in that shell exists as described earlier.

The high temperature radiant heat tubes or heat sources of the furnace are physically isolated from the ferrous articles being carburized. This results in a buildup of the carbon from the cracking enriching gas on such furnace structures with no subsequent removal of the buildup which typically occurs in the carbon shuttling process described earlier. The retained carbon buildup is detrimental to the furnace metallurgy and furnace operation. within the retort of the furnace, carburization is reduced because rapid cracking of the hydrocarbon enriching gas on the high temperature radiant tubes or heat sources is unavailable to carburize the ferrous articles. To compensate for this reduced carburizing rate in the retort, additional enriching gas has previously been added to the furnace to increase the available carbon at the lower carburizing rate. However, the problem of sooting is aggravated when the carburizing mixture is introduced at a greater flow rate or in a more enriched compositional range for the purpose of accelerating the carburizing treatment to attempt to increase furnace productivity and thereby debottleneck the entire production plant. Such carbon deposits on the shell of the furnace and the heat sources increase the chances of carburizing the alloy materials in the furnace, which carburization is undesired due to its detrimental affect on furnace components and component life. In order to remove the soot which becomes coated on the furnace inside shell surfaces and heat source apparatus, a furnace is typically burned out several times per month in order to remove such deposits before carburization occurs. Occasionally, the furnace needs to be taken apart to physically remove the carbon deposits. Such soot formation or carbon deposits on the radiant tubes or heat sources of the furnace also decrease the heat transfer from those sources to the retort of the furnace which results in poor furnace heating efficiency. All of these detrimental effects reduce the efficiency and increase the operating costs of the carburization process.

When using the endothermic or synthetic endothermic atmospheres having a composition of 20% CO, 40% $H_2$ and 40% $N_2$ by volume, it might be contemplated to introduce nitrogen into the shell side of a continuous rotary furnace to decrease sooting and maintain good heating from the radiant tubes or heat source. However, when such nitrogen usage is performed with the endothermic atmospheres, the nitrogen migrates into the retort and further retards the carburization reaction by increasing the level of inert from 40% to some higher level.

The present invention overcomes the soot formation problem and reduces the bottlenecking problem in carburizing furnaces, particularly those furnaces having discrete zones for the carburization of ferrous articles and for the location of the heat sources in the furnace. by introducing controlled atmospheres into the carburization zone and into the heat source zone, respectively.

In the operation of a continuous rotary furnace having a retort wherein the ferrous articles are carburized and having a shell in which the retort is located and in which the heat source or radiant heat tubes are situated, the present invention provides that the carburizing mixture of an oxygenated hydrocarbon and an enriching gas such as methane, are introduced to the exclusion of inert gases, such as nitrogen, into the inside space of the retort or carburizing zone. Simultaneously, an inert gas is introduced into the space defined by the outer surface of the retort and the inner surface of the shell of the furnace, which space is typically the location of the radiant heat tubes for the furnace or heat source zone.

These two separately counterproductive actions when used together provide an unexpected positive beneficial result; reduced sooting and enhanced carburization. The inert gas, particularly when it is nitrogen, precludes the formation of soot on the furnace shell or the furnace radiant heat tubes and effectively insulates the furnace from excessive heat losses. By reducing the inert content in the actual carburization zone within the retort, the rate of carburization is increased without increasing soot formation on the furnace shell.

Thus, the invention improves the carburization method in three distinct areas. First, the ferrous articles to be carburized are contacted with a concentrated carburizing mixture wherein no substantial concentration of inerts dilute this carburizing mixture. Substantially all of the mixture comprises an oxygenated hydrocarbon and an enriching gas, such as methane. This accelerates the rate of carburization of the articles being treated and thus reduces the bottleneck effect that the carburization furnace constitutes in the overall production plant for such articles. Second, the segregation of the carburizing atmosphere from the furnace shell, wherein an inert gas such as nitrogen is utilized, prevents the formation of soot or carbon deposits on the inside surfaces of the shell by preventing the carburizing atmosphere from leaving the retort and entering the space between the retort and the shell. Finally, the third attribute constitutes the heightened thermal efficiency of the blanketing inert gas over that of a carburizing gas mixture which thermal insulating capacity increases the heat efficiency of the furnace with the reduction in the attendant loss of heat through the apparatus. An additional attribute of the utilization of a separate inert gas stream is the safety provided in having a ready supply of inerting atmosphere which is already available in the furnace region. In the case of a malfunction, inerting gas can be readily admitted in greater quantities into the furnace, while carburizing mixture may be deleted, to provide an effective safety blanket of inert gas to shut down the furnace facility.

In the practice of the present method, it is desired to maintain a substantially inert atmosphere between the retort and the shell or heat source zone and a substantially pure carburizing mixture without inerts in the retort or the carburizing zone of the furnace. However, because it is impossible to isolate the work zone or retort atmosphere from the shell atmosphere in a carburizing furnace, there will be some inert or nitrogen which will flow into the retort or work zone and some hydrogen, hydrocarbons and carbon monoxide or carburizing mixture which will flow into the shell of the furnace. Therefore, although it is desired to have a pure carburizing mixture within the carburization zone and a pure inert gas in the furnace shell-side zone, it is understood that a minor amount of mixing will occur and can be tolerated without departing from the invention and the attributes that flow therefrom. In addition, an inert carrier gas may be used to inject the oxygenated hydrocarbon into the retort. Therefore up to 10% inert may exist in the carburizing mixture.

Based upon work previously shown, such as in U.S. Pat. No. 4,306,918 hereby incorporated herein by reference, it has been disclosed that the carbon deposition rate increases with an increase in carbon monoxide and hydrogen. Additionally, increasing the level of carbon monoxide to 50% and hydrogen to 50% in a carburizing atmosphere maximizes the rate of carbon deposition. An increase in carbon monoxide and hydrogen can be accomplished by the injection of pure methanol or other oxygenated hydrocarbons into the carburization zone, wherein under conditions of appropriate heat, the methanol or oxygenated hydrocarbon decomposes into carbon monoxide and hydrogen. Because of the higher level of carbon monoxide and hydrogen, the carbon deposition rate increases the carbon case depth for a fixed period of time. Alternately, the time for reaching a given case depth can be reduced.

The oxygenated hydrocarbon which is used in the carburizing mixture of the present invention can be selected from the group of carbon-hydrogen-oxygen compounds containing up to 3 carbon atoms, but with no more than one carbon to carbon bond, and having a carbon to oxygen ratio of from 1 to 2 and a boiling point not greater than 100° C. Such components include alcohols, aldehydes, ethers and esters, although the preferred component is methanol. Alternative compounds include ethanol, acetaldehyde, dimethylether, methylformate and methylacetate. Mixtures can be utilized.

The hydrocarbon enriching gas is preferably methane or natural gas, but may include any $C_1$ to $C_6$ hydrocarbon or mixture thereof.

In the preferred practice of the present invention, methanol and methane are added to the retort without a diluting quantity of inert gas. Nitrogen is added to the shell of the furnace to preclude the carbon deposition from a carburizing atmosphere in distinguishment from the introduction of an endothermic or synthetic endothermic atmosphere with enriching hydrocarbon gas introduced into the furnace as practiced in the prior art. The presence of nitrogen in the furnace shell prevents soot formation which is typically experienced in the prior art when the homogeneous endothermic or synthetic endothermic atmosphere and enriching gas contacts the furnace shell and affects a carbon deposition thereon. With nitrogen injection into the shell side of the carburizing furnace, as in the present invention, the carbon depositing species remain substantially in the retort where they will actually be utilized in the carburizing process and they will not have the opportunity to interfere with the radiant heating operation of the shell side of the carburizing furnace. Thus, by operating with discrete atmospheres in such a rotary furnace, simultaneous advantages are experienced by increasing the concentration of carburizing species in the carburization zone and decreasing the soot formation species in the thermal heat source or shell side zone, along with enhancing thermal nonconductivity when an inert such as nitrogen is utilized.

Figure 1:
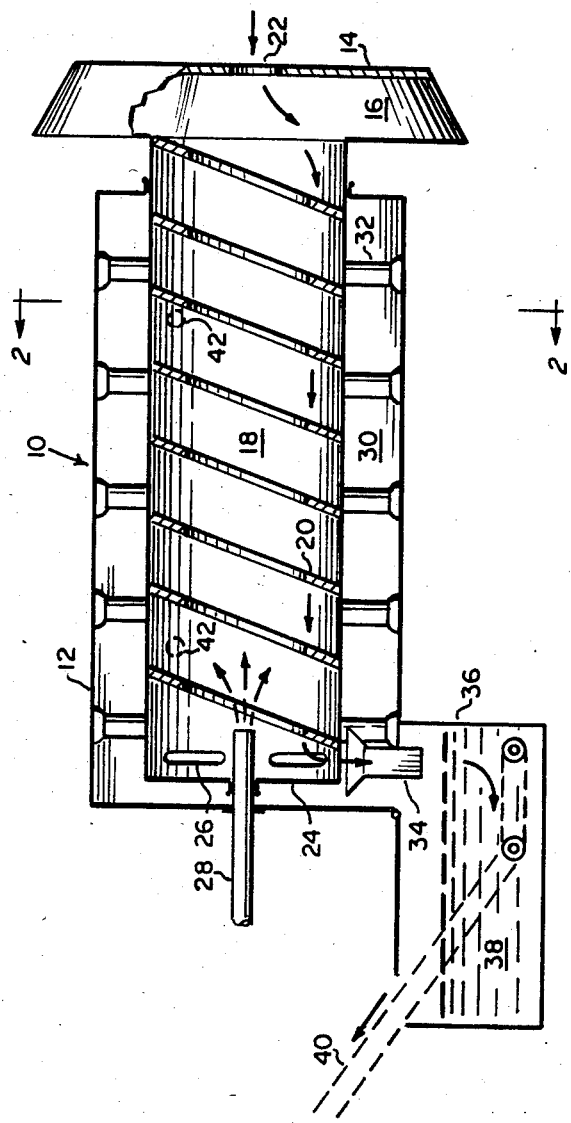
FIG. 1 constitutes a sectional side view of a rotary furnace along its longitudinal axis.

The specific environment in which the present invention may be used most beneficially is a continuous rotary carburizing furnace. The invention will be described in greater detail herein with reference to such a furnace as illustrated in FIG. 1 and FIG. 2. FIG. 1 shows a continuous rotary carburizing furnace in a sectional view along the longitudinal axis of the furnace. The furnace 10 comprises an outer firebrick lined steel shell 12, typically square or rectangular in cross-section. An approximately horizontal cylindrical retort 14 is located inside the shell 12 of the furnace 10. The retort 14 is supported so that it can rotate about its horizontal axis within the shell 12. Ferrous articles to be carburized are introduced through a leading aperture 22 into a hopper or holding zone 16. As the number of articles accrue, some of the articles spill over into the main portion of the retort 14 and are conveyed through the retort by the action of helical ribs 20 formed on the inside surface of the retort and occupying at least a portion of the interior carburizing zone 18 of the retort. The ferrous articles are carburized as they pass through zone 18 of the retort 14 and eventually pass out of the retort through apertures 26 near the end wall 24 of the retort. The ferrous articles are collected in a chute 34 and pass into quenching tank 36, which is filled with an oil bath 38. The quenched and carburized articles are then removed for further processing on a conveyor belt 40. Carburizing atmosphere, such as methanol and methane in a nitrogen carrier gas, is introduced through the inlet 28 in the end wall 24 of the retort. The nitrogen inert blanketing atmosphere which reduces the soot on the radiant tubes 32 and the shell 12 of the furnace 10 is introduced through apertures 42 in the sidewall of the furnace 10. This provides a substantially pure nitrogen atmosphere in the heat source zone 30 of the furnace shell 12. Such a nitrogen atmosphere in zone 30 of the furnace shell 12 protects the radiant heat tubes 32 situated on either side of retort 14 inside the furnace shell 12 from becoming sooted or coated with carbon wherein carburization could affect that metallurgy of the radiant heat tubes 32. Alternately, the tubes could constitute any of a number of heat sources such as an electrical heating element. The arrangement of the tubes is best viewed with regard to FIG. 2 wherein a cross section of the furnace 10, the shell 12 and the retort 14 is shown in which helical ribs 20 project only partially into the interior zone of the retort and the radiant tubes 32 are situated exterior to the retort and interior to the shell 12. As can be easily seen from the drawings, the high temperature surfaces of the radiant heat tubes 32 are segregated from the carburizing zone 18 of the interior of the retort 14 so that communication between the high temperature surfaces of the tubes 32 and the ferrous articles being carburized is prevented. It is in such a physically isolated furnace having descrete zones for heating and carburizing that the practice of the present invention using descrete atmospheres of inert gas and carburizing mixture is most beneficial.

Experiments were run utilizing the discreet carburizing and inerting atmospheres of the present invention in a continuous rotary furnace. The data for these experiments is set forth in Tables 1 and 2 below in which glide shells and screws (ferrous metal articles of AISI-SAE 10-18 steel) were subjected to similar experimental conditions, respectively. Glide shells are the metallic elements typically placed on the base of furniture which provide the primary contact with the floor. The screws were #8-18-½ inch special wafer head screws. The test procedure was performed in a AGF continuous rotary furnace operating with a standard nitrogen-methanol homogenous gas mixture, as well as with the discreet gas mixture and inerting medium of the present invention. The normal operating flowrates for such a furnace are nitrogen 160 SCFH, methanol 240 SCFH, ammonia 50 SCFH and natural gas 150 SCFH. The objective of the experiments was to compare identical parts heat treated in both endothermic and in a discreet atmosphere medium as described for the present invention. For both series of tests there were no variables other than the location of the gas inlets to the furnace. Test parameters that were held constant during the experiments included furnace temperature, flowrate of each gas, rotary speed of the retort, charge load size of articles to be carburized, material, and quench oil temperature. For the control test experiments utilizing a traditional endothermic atmosphere, all gases were introduced into the rear inlet of the furnace. The flowrate was sufficient to maintain positive furnace pressure while duplicating endothermic gas conditions. To test the present invention using discreet atmospheres, the inerting nitrogen gas addition was provided in the shell sidewall through available inlets, while the carburizing mixture was admitted through the rear inlet furnace. For each load of articles to be carburized or heat treated, parts to be analyzed in the experimental results were taken off the quench belt from the outlet end of the retort every 15 minutes beginning with the first parts out of the furnace. Tables 1 and 2 show the Rockwell hardness C scale verses case depth for each sample piece tested. The tests were conducted with a furnace temperature of approximately 1550° F. to 1700° F. For the screws which were carburized, the initial furnace temperature was at 1650° F., the mid-zone of the furnace was at 1700° F. and the final zone of the furnace was at 1550° F. For the glide shells the furnace was operated at 1650° F., 1700° F. and 1650° F. respectively for the various zones longitudinally spaced within the furnace. The flowrates for the various gases, if utilized, are set forth above. It is understood that during the course of the experiment involving the present invention only methanol ammonia and natural gas were admitted to the carburization zone and nitrogen was admitted to the shell zone of the furnace. This method is represented in the tables as ADP or treatment with an accelerated carburization process (ACP). The prior art is represented by the letters EDP in the tables which constitutes an endothermic treatment process. The ferrous articles to be carburized were passed through the furnace at a rate resulting in a residence time of 45 minutes, ±2 min. The test results indicate that there is a significant increase of effective case depth when using an accelerated carburizing atmosphere in discreet atmosphere conditions such that the carburizing atmosphere is substantially confined to the carburizing zone of the retort, while the inert atmosphere is substantially confined to the shell side zone of the carburizing furnace. It was also found that during the course of the tests no appreciable soot formation was found on the inside of the shell of the furnace, the outside surface of the retort, the radiant heat tubes or the furnace floor.

TABLE 1

| BS | GLIDE SHELL | EDP1 | EDP3 | EDP5 | EDP7 | ADP1 | ADP3 | ADP5 | ADP7 | EECD | AECD | DELTA | PCTIN |
|---|---|---|---|---|---|---|---|---|---|---|---|---|---|
| 1 | 1-A-1 | 58.5 | 58.4 | 52.0 | 35.6 | 52.4 | 58.5 | 56.2 | 48.2 | 5.24390 | 6.55000 | 1.30610 | 24.9070 |
| 2 | 1-A-2 | 52.7 | 60.5 | 60.9 | 42.6 | 57.6 | 58.2 | 54.3 | 47.1 | 6.19126 | 6.19444 | 0.00319 | 0.0515 |
| 3 | 1-A-3 | 57.4 | 58.8 | 50.9 | 39.7 | 57.4 | 59.8 | 54.5 | 48.9 | 5.16071 | 6.60714 | 1.44643 | 28.0277 |
| 4 | 1-B-1 | 56.7 | 59.5 | 52.7 | 39.2 | 56.6 | 58.4 | 55.6 | 48.3 | 5.40000 | 6.53425 | 1.13425 | 21.0046 |
| 5 | 1-B-2 | 54.7 | 59.4 | 54.5 | 43.4 | 57.9 | 58.8 | 53.9 | 47.4 | 5.81081 | 6.20000 | 0.38919 | 6.6977 |
| 6 | 1-B-3 | 56.4 | 59.8 | 52.6 | 41.9 | 56.3 | 59.8 | 53.7 | 46.3 | 5.48598 | 6.00000 | 0.51402 | 9.3697 |
| 7 | 3-A-1 | 56.6 | 55.9 | 43.6 | 30.7 | 56.8 | 59.9 | 55.2 | 48.2 | 3.95935 | 6.48571 | 2.52636 | 63.8076 |
| 8 | 3-A-2 | 56.3 | 55.9 | 44.1 | 25.3 | 56.6 | 60.1 | 53.2 | 48.7 | 4.00000 | 6.42222 | 2.42222 | 60.5556 |
| 9 | 3-A-3 | 54.8 | 56.9 | 46.4 | 23.3 | 54.2 | 60.7 | 55.5 | 47.8 | 4.31429 | 6.42857 | 2.11429 | 49.0066 |
| 10 | 3-B-1 | 47.9 | 57.7 | 51.4 | 41.2 | 56.9 | 58.7 | 53.6 | 47.0 | 5.27451 | 6.09091 | 0.81640 | 15.4782 |
| 11 | 3-B-2 | 51.5 | 57.1 | 50.4 | 42.2 | 56.2 | 58.6 | 53.9 | 47.4 | 5.09756 | 6.20000 | 1.10244 | 21.6268 |
| 12 | 3-B-3 | 56.2 | 57.8 | 49.7 | 43.1 | 56.8 | 59.1 | 54.0 | 46.1 | 4.92593 | 6.01266 | 1.08673 | 22.0615 |
| 13 | 5-A-1 | 55.5 | 58.9 | 47.8 | 26.1 | 58.0 | 58.5 | 54.8 | 47.3 | 4.60360 | 6.28000 | 1.67640 | 36.4149 |
| 14 | 5-A-2 | 55.3 | 58.8 | 44.8 | 22.5 | 57.7 | 57.9 | 52.2 | 45.8 | 4.25714 | 5.68750 | 1.43036 | 33.5990 |
| 15 | 5-A-3 | 55.7 | 58.1 | 48.4 | 25.5 | 56.5 | 58.8 | 53.3 | 46.9 | 4.67010 | 6.03125 | 1.36115 | 29.0060 |

TABLE 1-continued

| BS | GLIDE SHELL | EDP1 | EDP3 | EDP5 | EDP7 | ADP1 | ADP3 | ADP5 | ADP7 | EECD | AECD | DELTA | PCTIN |
|---|---|---|---|---|---|---|---|---|---|---|---|---|---|
| 16 | 5-B-1 | 54.7 | 57.2 | 44.2 | 22.5 | 57.5 | 57.8 | 52.6 | 45.2 | 4.10769 | 5.70270 | 1.59501 | 38.8298 |
| 17 | 5-B-2 | 55.8 | 55.2 | 45.7 | 19.8 | 54.7 | 58.9 | 54.0 | 46.2 | 4.09474 | 6.02564 | 1.93090 | 47.1558 |
| 18 | 5-B-3 | 55.5 | 57.1 | 43.9 | 20.8 | 54.3 | 58.8 | 52.2 | 46.0 | 4.07576 | 5.70968 | 1.63392 | 40.0887 |
| 19 | 7-A-1 | 56.4 | 53.9 | 39.2 | 17.0 | 55.8 | 57.7 | 52.5 | 46.0 | 3.53061 | 5.76923 | 2.23862 | 63.4060 |
| 20 | 7-A-2 | 57.6 | 55.6 | 39.0 | 19.8 | 55.6 | 57.5 | 52.3 | 47.0 | 3.67470 | 5.86792 | 2.19323 | 59.6845 |
| 21 | 7-A-3 | 55.2 | 54.1 | 40.6 | 13.7 | 55.8 | 57.6 | 51.9 | 46.2 | 3.60741 | 5.66667 | 2.05926 | 57.0842 |
| 22 | 7-B-1 | 56.3 | 55.8 | 43.5 | 22.9 | 56.8 | 59.4 | 53.5 | 37.1 | 3.94309 | 5.42683 | 1.48374 | 37.6289 |
| 23 | 7-B-2 | 57.7 | 55.6 | 40.9 | 17.3 | 56.1 | 58.6 | 52.8 | 41.0 | 3.76190 | 5.47458 | 1.71267 | 45.5267 |
| 24 | 7-B-3 | 56.9 | 56.1 | 44.9 | 20.9 | 57.5 | 59.9 | 53.8 | 36.3 | 4.08929 | 5.43429 | 1.34500 | 32.8908 |
| 25 | 9-A-1 | 58.8 | 54.4 | 39.8 | 17.1 | 56.5 | 56.8 | 52.3 | 43.7 | 3.60274 | 5.53488 | 1.93214 | 53.6299 |
| 26 | 9-A-2 | 57.4 | 55.9 | 42.2 | 17.6 | 57.7 | 59.0 | 53.8 | 46.0 | 3.86131 | 5.97436 | 2.11305 | 54.7235 |
| 27 | 9-A-3 | 56.7 | 54.7 | 44.0 | 17.7 | 55.7 | 58.8 | 52.6 | 46.6 | 3.87850 | 5.86667 | 1.98816 | 51.2610 |
| 28 | 9-B-1 | 58.2 | 58.2 | 50.5 | 24.0 | 56.3 | 57.7 | 52.3 | 44.8 | 5.03774 | 5.61333 | 0.57560 | 11.4257 |
| 29 | 9-B-2 | 58.2 | 58.5 | 50.1 | 26.2 | 53.7 | 57.5 | 52.1 | 45.1 | 5.00837 | 5.60000 | 0.59163 | 11.8129 |
| 30 | 9-B-3 | 56.3 | 57.4 | 48.1 | 27.2 | 57.9 | 58.9 | 53.7 | 46.2 | 4.59140 | 5.98667 | 1.39527 | 30.3888 |
| 31 | 11-A-1 | 55.7 | 59.7 | 51.2 | 43.7 | 56.9 | 58.8 | 51.4 | 4.1 | 5.32000 | 5.38356 | 0.06356 | 1.1948 |
| 32 | 11-A-2 | 56.1 | 58.8 | 51.1 | 44.8 | 56.3 | 57.4 | 52.4 | 45.1 | 5.34921 | 5.65753 | 0.30833 | 5.7640 |
| 33 | 11-A-3 | 53.4 | 58.4 | 52.7 | 43.5 | 57.3 | 58.3 | 53.2 | 44.8 | 5.58696 | 5.76190 | 0.17495 | 3.1314 |
| 34 | 11-B-1 | 56.5 | 56.4 | 40.0 | 16.6 | 56.1 | 58.7 | 54.6 | 47.6 | 3.80000 | 6.31429 | 2.51429 | 66.1654 |
| 35 | 11-B-2 | 54.8 | 56.8 | 46.2 | 23.1 | 57.6 | 58.2 | 54.8 | 43.7 | 4.28302 | 5.86486 | 1.58185 | 36.9330 |
| 36 | 11-B-3 | 56.7 | 56.5 | 44.9 | 15.2 | 57.3 | 60.9 | 54.5 | 47.1 | 4.12069 | 6.21622 | 2.09553 | 50.0038 |

EDP1-EDP7 = DEPTH IN THOUSANDTHS AT WHICH ROCKWELL HARDNESS WAS MEASURED FOR ENDO ATMOSPHERE
ADP1-ADP7 = DEPTH IN THOUSANDTHS AT WHICH ROCKWELL HARDNESS WAS MEASURED FOR ACP ATMOSPHERE
EECD = EFFECTIVE CASE DEPTH FOR ENDO
AECD = EFFECTIVE CASE DEPTH FOR ACP
DELTA = AECD − EECD = DIFFERENCE IN CASE DEPTH, ACP-ENDO
PCTIN = $\frac{AECD - EECD}{EECD} \times 100$ = PERCENT IMPROVEMENT WITH ACP

TABLE 2

| BS | SCREW | EDP2 | EDP4 | EDP6 | EDP8 | EDP10 | ADP2 | ADP4 | ADP6 | ADP8 | ADP10 | EECD | AECD | DELTA | PCTIN |
|---|---|---|---|---|---|---|---|---|---|---|---|---|---|---|---|
| 1 | 1-A-1 | 60.5 | 57.1 | 52.4 | 50.2 | 47.1 | 60.8 | 59.2 | 56.3 | 51.7 | 49.3 | 8.12903 | 9.4167 | 1.28763 | 15.840 |
| 2 | 1-A-2 | 60.1 | 57.9 | 53.5 | 50.0 | 46.3 | 60.3 | 58.3 | 54.5 | 51.1 | 49.1 | 8.00000 | 9.1000 | 1.10000 | 13.750 |
| 3 | 1-B-1 | 59.8 | 58.1 | 53.0 | 50.1 | 47.3 | 59.8 | 58.6 | 55.4 | 47.7 | 44.8 | 8.07143 | 7.4026 | −0.66883 | −8.286 |
| 4 | 1-B-2 | 60.0 | 56.6 | 52.5 | 49.8 | 47.0 | 60.0 | 56.9 | 51.4 | 51.7 | 49.4 | 7.85185 | 9.4783 | 1.62641 | 20.714 |
| 5 | 1-C-1 | 60.7 | 57.2 | 53.0 | 50.3 | 48.0 | 59.0 | 56.6 | 53.5 | 48.5 | 47.6 | 8.26087 | 7.4000 | −0.86087 | −10.421 |
| 6 | 1-C-2 | 60.2 | 58.1 | 53.4 | 50.1 | 47.6 | 54.7 | 56.9 | 53.0 | 49.1 | 47.4 | 8.08000 | 7.5385 | −0.54154 | −6.702 |
| 7 | 3-A-1 | 58.2 | 55.5 | 51.2 | 47.8 | 46.1 | 59.5 | 56.8 | 52.6 | 47.5 | 45.5 | 6.70588 | 7.0196 | 0.31373 | 4.678 |
| 8 | 3-A-2 | 58.4 | 55.7 | 51.6 | 48.3 | 46.1 | 59.9 | 57.6 | 52.8 | 48.0 | 45.9 | 6.96970 | 7.1667 | 0.19697 | 2.826 |
| 9 | 3-B-1 | 56.5 | 56.8 | 53.0 | 48.9 | 47.1 | 59.8 | 57.1 | 53.1 | 50.1 | 47.3 | 7.46341 | 8.0714 | 0.60801 | 8.147 |
| 10 | 3-B-2 | 59.8 | 57.0 | 52.0 | 49.2 | 46.3 | 59.6 | 57.6 | 53.6 | 51.5 | 49.3 | 7.42857 | 9.3636 | 1.93506 | 26.049 |
| 11 | 3-C-1 | 59.8 | 58.4 | 53.5 | 49.2 | 46.9 | 58.7 | 58.6 |  | 54.6 | 50.0 | 7.62791 | 10.0000 | 2.37209 | 31.098 |
| 12 | 3-C-2 | 60.3 | 56.9 | 52.0 | 47.9 | 45.7 | 59.8 | 57.0 | 53.7 | 49.7 | 46.9 | 6.97561 | 7.8500 | 0.87439 | 12.535 |
| 13 | 5-A-1 | 58.5 | 56.6 | 52.2 | 48.3 | 45.8 | 58.3 | 56.2 | 51.9 | 48.5 | 46.9 | 7.12821 | 7.1176 | −0.01056 | −0.148 |
| 14 | 5-A-2 | 60.3 | 58.0 | 51.6 | 48.6 | 45.7 | 58.9 | 55.9 | 51.9 | 48.0 | 46.3 | 7.06667 | 6.9744 | −0.09231 | −1.300 |
| 15 | 5-B-1 | 57.8 | 54.3 | 51.1 | 48.6 | 46.3 | 56.2 | 56.5 | 52.2 | 48.8 | 46.8 | 6.88000 | 7.2941 | 0.41412 | 6.000 |
| 16 | 5-B-2 | 57.6 | 53.9 | 50.0 | 47.7 | 45.9 | 58.1 | 55.9 | 52.2 | 49.2 | 46.6 | 6.00000 | 7.4667 | 1.46667 | 24.444 |
| 17 | 5-C-1 | 59.8 | 57.5 | 53.1 | 49.8 | 47.3 | 58.4 | 56.4 | 52.4 | 50.1 | 47.9 | 7.87879 | 8.0909 | 0.21212 | 2.692 |
| 18 | 5-C-2 | 58.5 | 60.0 | 55.3 | 50.9 | 48.3 | 58.6 | 57.4 | 53.4 | 50.6 | 47.8 | 8.69231 | 8.4286 | −0.26374 | −3034 |
| 19 | 7-A-1 | 59.0 | 55.9 | 50.2 | 46.3 | 44.4 | 60.2 | 59.7 | 56.1 | 53.3 | 50.5 | 6.10256 | 10.2759 | 4.17334 | 68.387 |
| 20 | 7-A-2 | 60.0 | 58.0 | 52.4 | 49.1 | 46.4 | 60.4 | 58.8 | 57.3 | 53.6 | 50.4 | 7.45455 | 10.2500 | 2.79545 | 37.500 |
| 21 | 7-B-1 | 52.9 | 58.0 | 53.0 | 48.7 | 44.7 | 57.5 | 56.1 | 52.6 | 50.6 | 47.3 | 7.39535 | 8.3636 | 0.96829 | 13.093 |
| 22 | 7-B-2 | 59.6 | 57.2 | 52.3 | 48.2 | 45.7 | 58.6 | 56.3 | 53.1 | 50.3 | 47.0 | 7.12195 | 8.1818 | 1.05987 | 14.882 |
| 23 | 7-C-1 | 57.8 | 53.7 | 48.6 | 45.9 | 44.1 | 58.2 | 54.3 | 51.0 | 47.9 | 45.9 | 5.45098 | 6.6452 | 1.19418 | 21.908 |
| 24 | 7-C-2 | 57.9 | 54.7 | 49.5 | 46.3 | 44.5 | 57.8 | 54.0 | 51.7 | 48.7 | 45.8 | 5.80769 | 7.1333 | 1.32564 | 22.826 |
| 25 | 9-A-1 | 58.3 | 54.4 | 49.1 | 47.1 | 40.8 | 56.3 | 54.4 | 49.7 | 47.6 | 46.7 | 5.66038 | 5.8723 | 0.21196 | 3.745 |
| 26 | 9-A-2 | 58.5 | 57.8 | 52.6 | 48.6 | 46.4 | 58.2 | 53.7 | 51.1 | 47.6 | 46.1 | 7.30000 | 6.6286 | −0.67143 | −9.198 |
| 27 | 9-B-1 | 57.8 | 53.1 | 47.4 | 44.4 | 43.2 | 58.7 | 56.8 | 52.8 | 49.8 | 47.1 | 5.08772 | 7.8667 | 2.77895 | 54.621 |
| 28 | 9-B-2 | 56.8 | 52.2 | 47.1 | 43.7 | 42.2 | 58.2 | 55.9 | 52.5 | 48.2 | 45.6 | 4.86275 | 7.1628 | 2.30005 | 47.299 |
| 29 | 9-C-1 | 58.5 | 55.6 | 51.5 | 48.7 | 46.1 | 58.3 | 57.5 | 52.4 | 48.5 | 46.0 | 7.07143 | 7.2308 | 0.15934 | 2.253 |
| 30 | 9-C-2 | 57.2 | 52.9 | 49.0 | 45.7 | 44.6 | 58.2 | 55.0 | 51.7 | 48.0 | 46.0 | 5.48718 | 6.9189 | 1.43174 | 26.092 |
| 31 | 11-A-1 | 58.8 | 54.6 | 48.2 | 45.3 | 44.4 | 58.0 | 56.1 | 51.7 | 48.7 | 46.9 | 5.43750 | 7.1333 | 1.69583 | 31.188 |
| 32 | 11-A-2 | 59.2 | 53.9 | 48.5 | 46.7 | 44.9 | 57.9 | 53.9 | 50.9 | 47.5 | 45.8 | 5.44444 | 6.5294 | 1.08497 | 19.928 |
| 33 | 11-B-1 | 57.5 | 54.4 | 49.6 | 47.1 | 45.5 | 58.4 | 56.4 | 52.2 | 48.7 | 45.9 | 5.83333 | 7.2571 | 1.42381 | 24.408 |
| 34 | 11-B-2 | 57.0 | 52.4 | 47.3 | 47.0 | 44.4 | 46.1 | 56.2 | 52.3 | 49.9 | 46.7 | 4.94118 | 7.9167 | 2.97549 | 60.218 |
| 35 | 11-C-1 | 59.8 | 54.3 | 50.3 | 46.2 | 44.1 | 58.8 | 55.5 | 51.1 | 47.8 | 44.8 | 6.14634 | 6.6667 | 0.52033 | 8.466 |
| 36 | 11-C-2 | 60.0 | 55.7 | 49.2 | 46.3 | 44.2 | 54.0 | 54.8 | 50.7 | 48.1 | 45.5 | 5.75385 | 6.5385 | 0.78462 | 13.600 |

EDP2-EDP10 = DEPTH IN THOUSANDTHS AT WHICH ROCKWELL HARDNESS WAS MEASURED FOR ENDO ATMOSPHERE
ADP2-ADP10 = DEPTH IN THOUSANDTHS AT WHICH ROCKWELL HARDNESS WAS MEASURED FOR ACP ATMOSPHERE
EECD = EFFECTIVE CASE DEPTH FOR ENDO
AECD = EFFECTIVE CASE DEPTH FOR ACP
DELTA = AECD − EECD = DIFFERENCE IN CASE DEPTHS, ACP-ENDO
PCTIN = $\frac{AECD - EECD}{EECD} \times 100$ = PERCENT IMPROVEMENT WITH ACP Based upon the work reported in Table 1 and 2, a statistically significant increase in the effective case depth of both glide shells and screws as articles of carburization treatment was achieved when the method of the present invention was utilized in contrast to the synthetic endothermic atmosphere of the prior art. The average increase in effective case depth for glide shells was 1.413 thousandths of an inch and the average increase in effective case depth for screws was 1.005 thousandths of an inch. For glide shells, the average percent increase in effective case depth when using the present invention over the endothermic atmospheres of the prior art is 33.7%. For screws, the average percent increase in effective case depth when using the present invention over the endothermic atmospheres of the prior art is 16.34%. Therefore, the present invention demonstrates a remarkable increase in the carburization capability of a continuous rotary furnace or other furnace structures wherein the carburization zone is isolated from the heat source zone. These increases in carburization which have been shown by experimental results with regard to carburized articles comprising glide shells and screws when teamed in conjunction with the observed absence of soot formation in the shell side of the furnace, as well as the contemplated savings in thermal heat loses through the inert blanking medium between the carburizing zone and the shell of the furnace provide a unique and unexpected attribute in the art of carburizing ferrous parts.

Tests were actually performed on a rotary retort furnace made by Atmosphere Furnace Co. to determine the carbon monoxide and hydrogen levels of the heat source zone of the furnace shell when practicing the present invention wherein methanol and methane are injected into the retort and nitrogen is injected into the shell side. Based upon measurements over a period of time at different points in the shell, carbon monoxide levels were in the range of 7–8%, while hydrogen levels were in the range of 4–10%. This demonstrates the capability of the present invention to preclude substantial carburizing atmospheres from existing in the heat source zone or shell of the rotary retort furnaces. This contrasts with the prior art practice, where with an exemplary endothermic atmosphere, carbon monoxide levels could be as high as 20% and hydrogen levels as high as 40%. The difference can be translated into a significant reduction in undesired carbon deposition and furnace structure carburization with the practice of the present invention in contrast to the prior art.

Having thus described our invention, what is desired to be secured by letters patent of the United States is set out in the appended claims:

1. In a method for carburizing ferrous metal articles in a furnace in which a heat source is in a discrete zone segregated, but not physically isolated from the carburizing zone where the articles are processed and there is flow communication between the zones, the improvement comprising introducing a carburizing mixture of an oxygenated hydrocarbon and a hydorcarbon enriching gas into the carburizing zone substantially without any inert gas while introducing an inert gas into the zone of the heat source substantially without any carburizing mixture.

2. The method of claim 1 wherein the hydrocarbon enriching gas is methane.

3. The method of claim 1 wherein the hydrocarbon enriching gas is ethane.

4. The method of claim 1 wherein the hydrocarbon enriching gas is propane.

5. The method of claim 1 wherein the inert gas is nitrogen.

6. The method of claim 1 wherein the furnace is a continuous rotary furnace.

7. The method of claim 6 wherein the furnace has a rotary retort into which the carburizing mixture is introduced and a furnace shell containing the heat source into which the inert gas is introduced.

8. The method of claim 1 wherein the oxygenated hydrocarbon is selected from the group comprising alcohols, aldehydes, esters, ethers and mixtures thereof having up to three carbon atoms.

9. The method of claim 1 wherein the oxygenated hydrocarbon is methanol.

10. The method of claim 1 wherein the carburizing mixture comprises methanol, methane and up to 10% by volume of an inert gas.

* * * * *